United States Patent [19] [11] 4,401,993
Moriguchi et al. [45] Aug. 30, 1983

[54] HEAT-SENSITIVE TYPE MULTI-GRADATION IMAGE RECORDING APPARATUS

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 295,290

[22] Filed: Aug. 24, 1981

[30] Foreign Application Priority Data

Aug. 25, 1980 [JP] Japan .................................. 55-115915

[51] Int. Cl.$^3$ ..................... G01D 15/10; H05B 3/00; H04N 1/22
[52] U.S. Cl. ............................. 346/76 PH; 219/216; 358/298
[58] Field of Search ............... 346/76 PH; 358/298; 219/216

[56] References Cited

U.S. PATENT DOCUMENTS 4,071,849 1/1978 Koyano et al. ............. 346/76 PH X
4,241,421 12/1980 Burke et al. ..................... 358/298 X
4,276,569 6/1981 Kirk, Jr. ............................. 358/298

Primary Examiner—George H. Miller, Jr.
Attorney, Agent, or Firm—Sughrue, Mion, Zinn, Macpeak, and Seas

[57] ABSTRACT

A heat-sensitive type multi-gradation image recording apparatus adapted for use with a conventional two-valued recording apparatus including a simple device for identifying image signal levels for recording multi-gradation images. A plurality of heat generating resistance elements are arranged one-dimensionally in correspondence to picture elements. A video signal is converted into a plurality of binary video signals using different threshold level values. Electrical energy is supplied to the heat generating elements controlled by the binary video signals to record and image in an overlap mode.

3 Claims, 4 Drawing Figures

HEAT-SENSITIVE TYPE MULTI-GRADATION IMAGE RECORDING APPARATUS

BACKGROUND OF THE INVENTION

The invention relates to a multi-gradation image recording apparatus using a heat-sensitive type recording head. More particularly, the invention relates to a multi-gradation type image recording apparatus in which a number of heat generating elements are arranged one-dimensionally in correspondence to picture elements, and a heat-sensitive type recording head designed so as to drive the heat generating elements with binary video signals is used to record an image in an overlap mode.

In a conventional multi-gradation image recording operation using a heat-sensitive type recording head, energy for exciting the heat generating elements (which are provided respectively for the picture elements) is controlled according to the gradations of the picture elements. Therefore, drive elements, the number of which is equal to the number of heat generating elements driven simultaneously, are so controlled as to supply energy corresponding to the required gradations to the respective heat generating elements.

First, a conventional two-valued (binary) image recording apparatus, which is extensively employed, will be briefly described.

FIG. 1 is a block diagram of a circuit used in the two valued image recording apparatus. A binary video signal VS delivered in a time-series mode is loaded into a shift register 1, where it is converted into parallel signals $7_1$, $7_2$ ... and $7_5$. These signals $7_1$ through $7_5$ are applied to AND gates $2_1$ through $2_5$, respectively. The electrical energy of a power source 6 is applied to the remaining input terminals of the AND gates $2_1$ through $2_5$ where it is ANDed with the parallel binary video signals $7_1$ through $7_5$.

The outputs of the AND gates $2_1$ through $2_5$ are applied to respective heat generating resistance elements $3_1$ through $3_5$ of a heat generating head. The apparatus has block specifying switches 4 and 5, which are closed one at a time so that the heat generating resistance elements which are specified by the closed block specifying switch, and the parallel signals $7_1$ through $7_5$, are excited to contribute to the image recording operation.

For instance, when the parallel binary video signals $7_1$ through $7_5$ represent "0 1 1 0 1" and the block specifying switch 4 is closed, current is applied from the power source 6 to heat generating resistance elements $3_2$, $3_3$ and $3_5$ to cause the latter to generate heat, while no current is applied to the remaining heat generating resistance elements $3_1$ and $3_4$; i.e. the elements $3_1$ and $3_4$ generate no heat.

When, at the following time instant, the parallel binary video signals $7_1$ through $7_5$ are changed to represent "1 0 0 1 1" and the block specifying switch 5 is closed, only the heat generating resistance elements $3_6$, As a result of the above-described operation, a two-valued image the density of which is represented by "0 1 1 0 1 1 0 0 1 1" (where "0" represents white and "1" represents "black", for instance) is recorded on a heat-sensitive sheet.

In order to carry out a multi-gradation image reproduction with the above-described conventional apparatus, it is necessary to both employ multi-level signals whose levels correspond to more than three gradations, as in the aforementioned parallel video signals $7_1$ through $7_5$, and to identify which gradation each signal represents.

In addition, according to the identification results, either the amount of electrical energy supplied to the AND gates $2_1$ through $2_5$ from the power source 6 or the timing of opening the AND gates must be controlled.

Therefore, the conventional apparatus is disadvantageous in that it is intricate in construction and low in reliability. In addition, conventional apparatus suffers from the drawbacks that, since the energy applied to the heat generating elements changes with the gradations of a picture to be recorded, as the density of a picture element increases, the size, of the picture element also increases, such that the resolution of the recorded image is decreased, (that is, the recorded image is low in quality).

SUMMARY OF THE INVENTION

Accordingly, an object of the invention is to provide a heat-sensitive type multi-gradation image recording apparatus in which a conventional two-valued image recording apparatus is employed, and a simple means for identifying image signal levels is added thereto so as to record multi-gradation images.

In order to achieve the foregoing object, in accordance with the invention, a conventional two-valued image recording apparatus is used and, a video signal on a scanning line is applied to a plurality of comparators having different threshold values to form a plurality of binary video signals. The signals are binary-coded with the different threshold levels, and the binary video signals thus formed are applied to the two-valued image recording apparatus to record an image in an overlap mode.

DESCRIPTION OF THE PREFERRED EMBODIMENTS

Figure 1:
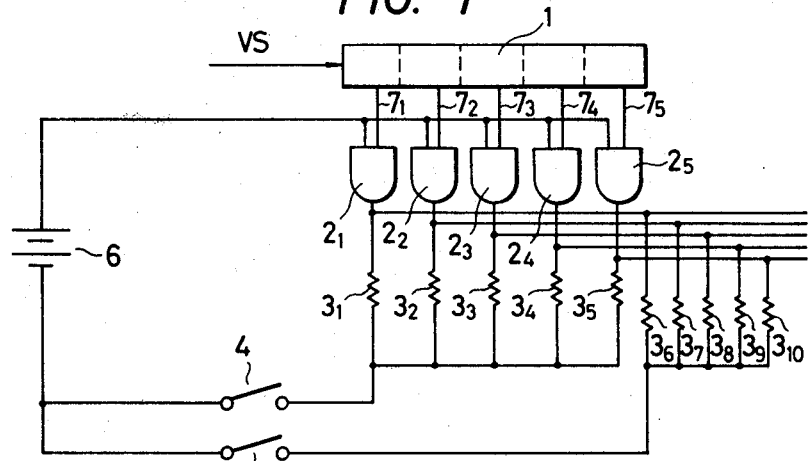
FIG. 1 is a block diagram showing a conventional two-valued image recording apparatus to which the technical concept of the invention is applied.
Figure 2:
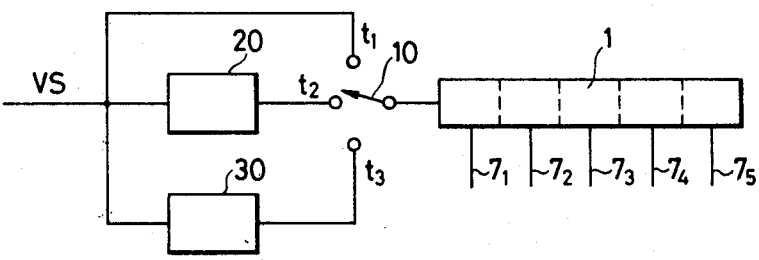
FIG. 2 is a block diagram showing an example of essential parts of a heat-sensitive type multi-gradation image recording apparatus according to the invention.
Figure 3:
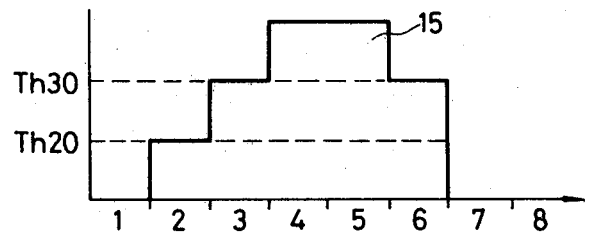
FIGS. 3 and 4 are waveform diagrams for a description of the operations of the apparatus according to the invention.
Figure 4:
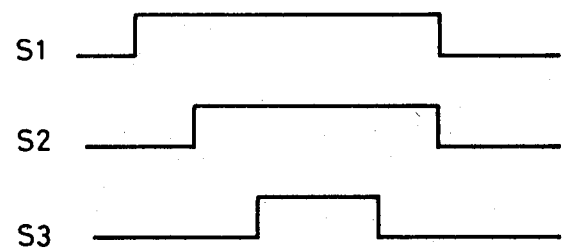

FIG. 2 is a block diagram showing the essential parts of a heat-sensitive type multi-gradation image recording apparatus according to the invention. FIGS. 3 and 4 are waveform diagrams for a description of the operation of the apparatus. In FIGS. 2 and 1, like parts are designated by like reference numerals or characters. In FIG. 2, reference numerals 20 and 30 designate comparators having different threshold levels. The comparators 20 and 30 have threshold levels Th20 and TH30 as shown in FIG. 3, respectively.

In the case where an input video signal VS has a waveform as indicated at 15 in FIG. 3, output waveforms S1, S2 and S3 shown in FIG. 4 are provided at the contacts $t_1$, $t_2$ and $t_3$ of a change-over switch 10, respectively.

If the armature of the change-over switch 10 is set to the various contacts successively in sequence in synchronization with a line scanning three times or with the reading of a scanning line three times from a memory, then at the first switch position (i.e. at the first signal input) the waveform S1 in FIG. 4 is applied to the shift register 7, at the second signal input the waveform S2 in FIG. 4 is applied to the register 7, and at the third signal input the waveform S3 in FIG. 4 is applied to the register 7. Then, similarly as in the above-described conventional apparatus, the heat generating resistance elements $3_1, 3_2 \ldots$ are activated according to the signals S1 through S3 so that the image is recorded in an overlap mode.

Thereafter, in this case, a picture element region corresponding to the heat generating resistance element $3_2$ is recorded once, picture element regions corresponding to the heat generating resistance elements $3_3$ and $3_6$ are recorded twice, and picture element regions corresponding to the heat generating resistance elements $3_4$ and $3_5$ are recorded three times.

The density of a picture element recorded twice is greater than that of a picture element recorded once, and the density of a picture element recorded three time is greater than that of the picture element recorded twice. Thus, an image having four gradations (including "white") can be recorded.

When an image is recorded in the overlap mode according to the invention, it is unnecessary to vary the magnitude of energy exciting the heat generating resistance elements $3_1, 3_2$ etc. due to the following reasons:

(1) Materials which have been subjected to development and materials which have not are present on the heat-sensitive recording sheet until such time as all the materials are developed (i.e., the density of the sheet reaches saturation). Therefore, the percentage of material which has been subjected to development action can be increased at a picture element position by repeatedly applying thermal energy. As a consequence, the density of the picture element position is gradually increased.

(2) For a certain period of time after excitation, generated heat remains in the heat generating resistance element. Therefore, when the heat generating resistance element is excited repeatedly its temperature is increased every excitation because of the residual heat thereof, even if the applied electrical energy and the generated heat are equal during every excitation. Thus, the development action of the recording is accelerated every excitation.

An input video signal having multi-gradations as shown by the waveform 15 in FIG. 3 is decomposed into binary signals as indicated at S1, S2 and S3 in FIG. 4 either at the signal reading side or at the signal transmitting side, such that the binary signals are transmitted to the signal receiving side. Also, the number of gradations can be increased as desired by increasing the number of comparators.

As described above, in accordance with the invention, an image can be recorded in an overlap mode by using binary signals, with the energy for exciting the heat generating resistance elements being maintained at a constant level. Therefore, halftone images having many gradations can be recorded with high image quality.

According to the invention, fundamentally, the size of each picture element is constant irrespective of gradations. Therefore, the invention can eliminate the drawback of the conventional apparatus that the size of high density picture elements is increased while the size of low density picture elements is decreased which makes the resultant image irregular in density and reduces the image quality.

In view of the recent tendency to both increase signal transmission speed and to employ digital signal transmission and processing, the recording apparatus of the invention is considerably advantageous when compared to the conventional apparatus.

It can be readily understood that the invention is applicable not only to the above-described heat-sensitive type recording operation, but also to a recording apparatus which, as in the case of silver salt pictures or electronic pictures, uses binary signal inputs and a recording medium with which the density of a recorded image is increased by repeating the recording operation.

What is claimed is:

1. A heat sensitive type multi-gradation image recording apparatus comprising:
    a plurality of heat generating resistance elements arranged one-dimensionally in correspondence to picture elements;
    means for converting a video signal into a plurality of binary video signals using different threshold values said means comprising a plurality of comparators being coupled commonly to receive said video signal, each of said comparators having a different threshold value, a switch having input contacts receiving outputs from said comparators, and a shift resistor having a serial input coupled to an output contact of said switch; and
    means for supplying electrical energy to said heat generating resistance elements controlled by said binary video signals to record an image in an overlap mode.

2. The heat-sensitive type multi-gradation image recording apparatus of claim 1 wherein said switch has an input contact coupled to receive said video signal directly.

3. The heat-sensitive type multi-gradation image recording apparatus of claim 1 or 2 wherein said switch is sequenced among said input contacts.

* * * * *